G. F. MILLER.
FILTER PRESS DEVICE.
APPLICATION FILED JUNE 7, 1919.
1,333,869.
Patented Mar. 16, 1920.
3 SHEETS—SHEET 1.
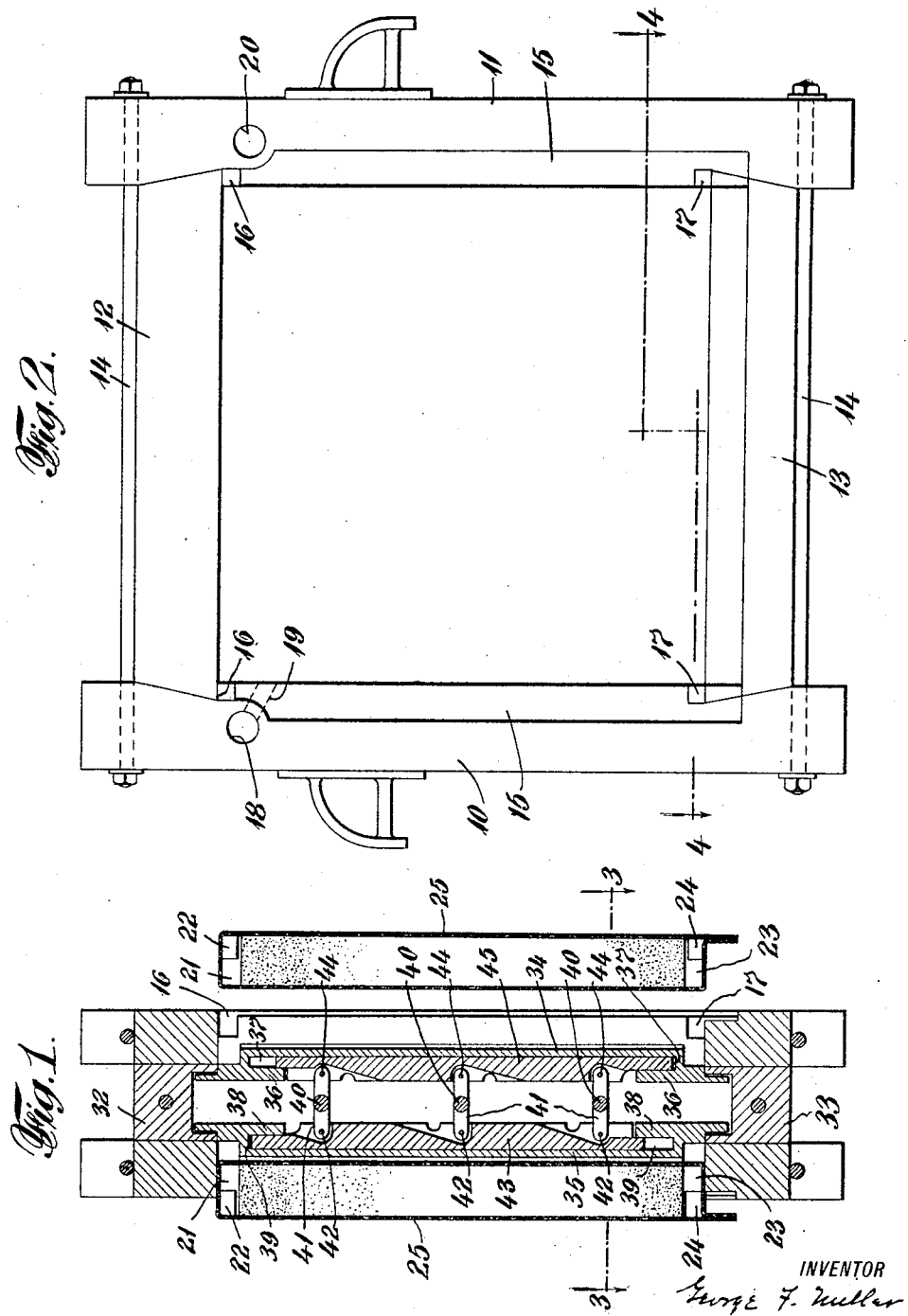
INVENTOR
George F. Miller
BY
his ATTORNEY

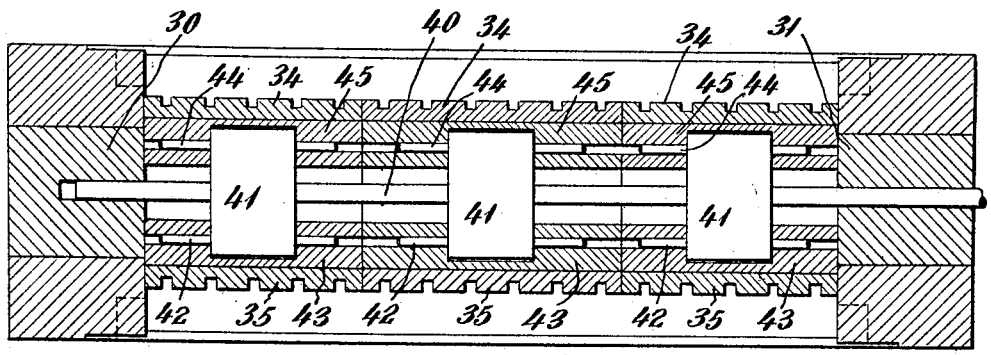
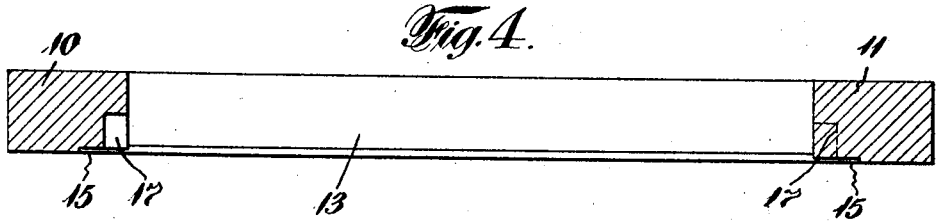
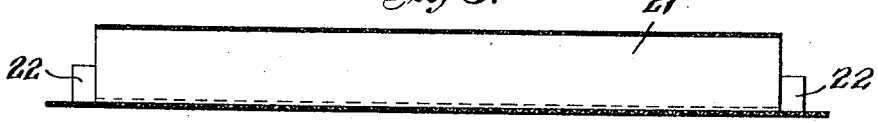
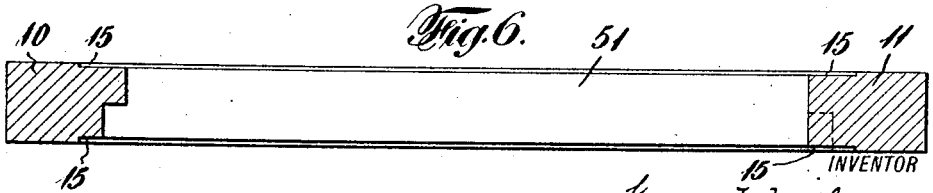

G. F. MILLER.
FILTER PRESS DEVICE.
APPLICATION FILED JUNE 7, 1919.
1,333,869.
Patented Mar. 16, 1920.
3 SHEETS—SHEET 3.
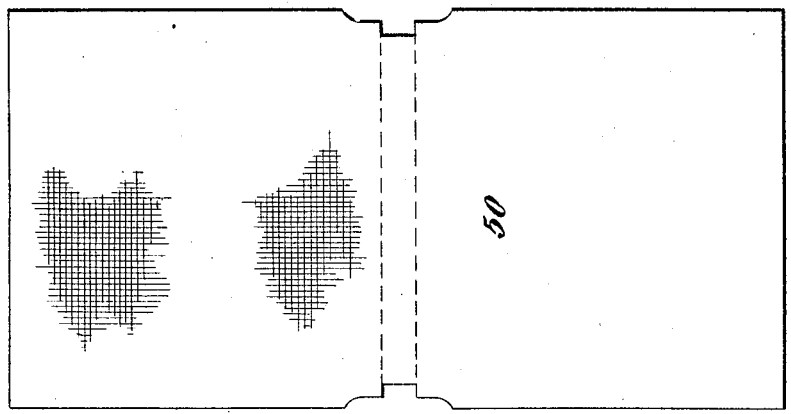
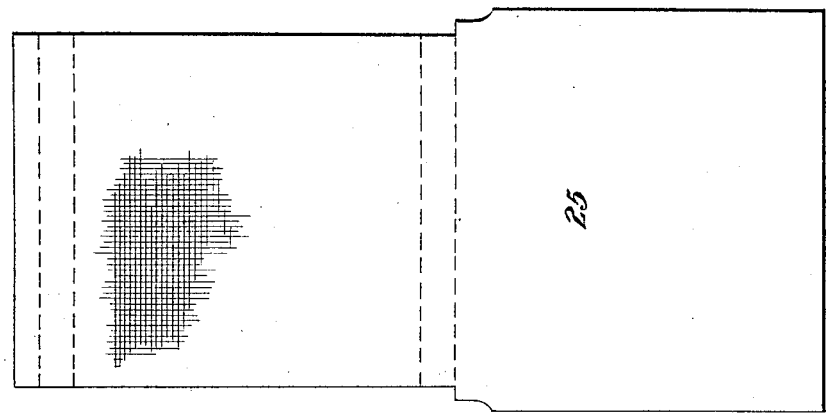
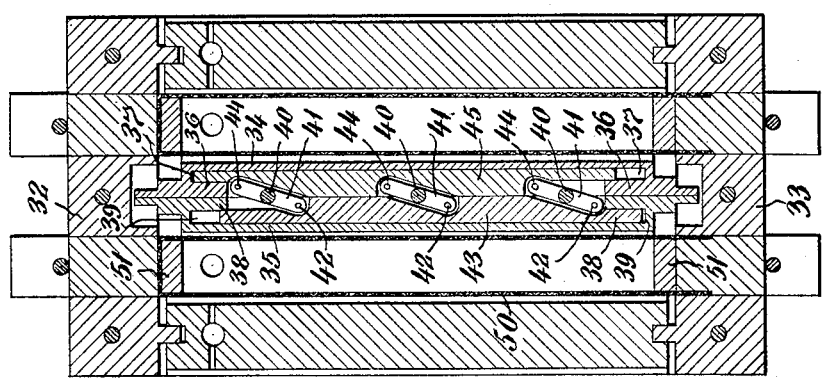
INVENTOR
George F. Miller
BY
his ATTORNEY

UNITED STATES PATENT OFFICE.

GEORGE F. MILLER, OF NEW YORK, N. Y.

FILTER-PRESS DEVICE.

1,333,869.  Specification of Letters Patent.  Patented Mar. 16, 1920.

Application filed June 7, 1919. Serial No. 302,382.

*To all whom it may concern:*

Be it known that I, GEORGE F. MILLER, a citizen of the United States, residing in the city of New York, county of New York, borough of Manhattan, and State of New York, have invented certain new and useful Improvements in Filter-Press Devices, of which the following is a full, clear, and exact specification.

My invention relates to filter press devices and refers particularly to filter press frames.

One object of my invention is a filter press frame having a removable filter cloth support.

Another object of my invention is a filter press frame capable of carrying a filter cloth which can be removed from the frame by means of an abutting expansible member.

Another object of my invention is a filter press frame carrying means for the effective removal of a filter cloth and its filtered contents therefrom.

Another object of my invention is a filter press frame so constructed that a filter cloth may be employed therewith without danger of interfering with the flow of liquid through the feed conduits.

Another object of my invention is a filter press frame of such construction that the treated material cannot get behind the filter cloth and thus escape unfiltered.

The above and other objects of my invention will be evident upon a consideration of the accompanying drawings, specification and claims.

The ordinary filter press comprises a series of alternate abutting filter press plates and filter press frames with filter cloth interposed. A series of chambers is thus formed, each inclosed by the four sides of a frame and the filter cloth abutting upon the adjacent plates. The material to be filtered is forced into this frame chamber, the liquid passing outwardly through the filter cloth and the solid, or filtered, material remaining within the chamber. After the filtering and subsequent washing operations are completed it is necessary to remove the material from the cloth and to wash the cloth for the next operation, or replace it with another cloth.

Each frame and plate has a plurality of conduits in its side frame in alinement with similar conduits in the abutting members for the purpose of the introduction of the material to be filtered and of wash water.

The usual method of assembling the frame and the cloth, is to have a filter cloth practically twice the size of the frame. The cloth is thrown over the top of the frame so that it will hang upon both sides of the frame. It is therefore necessary that the cloth have holes corresponding to the conduits in the frame and these cloth holes must fit exactly around each conduit, as otherwise the cloth would extend partly, or wholly, across the conduit, thus interfering with the free flow of the liquid, and in addition to the above mentioned difficulty, there is a possibility that the material to be filtered will be forced behind the cloth, thus contaminating the filtrate and causing a loss of the solid matter.

It is evident, therefore, that the greatest care must be exercised in arranging the cloth.

When the filtering process is completed, it is necessary to remove the filtered material. This is usually accomplished by separating the plates and frames, removing one side of the cloth and digging out the filtered material by means of a suitable instrument and then removing the cloth from the frame. This process requires considerable manual labor and expenditure of time and results in a loss of material.

The device of my invention overcomes all of the above described difficulties and presents a means whereby the filter cloth may be readily and rapidly applied to the frame, prevents all possibility of interfering with the flow of liquid through the conduits, prevents the material from being forced back of the cloth, reduces the time and labor of emptying the frame and prevents loss of material.

In the accompanying drawings, illustrating modifications of the device of my invention, similar parts are designated by similar numerals.

Figure 1 is a vertical cross-section of two of my devices assembled with an expansible member in expanded position.

Fig. 2 is a plan view of a filter press frame of my invention.

Fig. 3 is a section through the line 3—3 with cloth retainer removed.

Fig. 4 is a section through the line 4—4 of Fig. 2.

Fig. 5 is a top plan view of cloth retaining member with cloth.

Fig. 6 is a horizontal section of the modification of the frame as shown in Fig. 7.

Fig. 7 is a vertical section of two modified forms of my devices assembled with an expansible member in non-expanded position.

Fig. 8 is a development of the cloth shown in Fig. 1.

Fig. 9 is a development of the cloth shown in Fig. 7.

The particular filter press frame, shown in Figs. 1 to 5 and Fig. 8, of the accompanying drawings, comprises the side members 10 and 11, the top member 12 and the bottom member 13, maintained in position by the stay bars 14, 14, within a face of each of the side members 10 and 11. There is a recess 15 to receive the filter cloth. Within each side member 10 and 11 are two recesses 16 and 17 to receive the filter cloth supporting members. A conduit 18 for the passage of the material to be filtered is connected to the interior of the frame by the conduit 19. A conduit 20 extends through the side member for the passage of wash water.

The cloth supporting member comprises a member 21 capable of placement between the end members 10 and 11, and having the extended end members 22, 22 capable of placement within the recesses 16, 16. There is a similar member 23, having extended end members 24, 24, capable of placement within the recesses 17, 17. A filter cloth 25 (Fig. 8) is capable of being placed over the supporting member 21, one portion being passed beneath the member 23, so that when the extended ends 22 and 24 are placed within the recesses 16, 16, 17, 17, one side of the filter cloth 25 will repose within the recesses 15, 15. The cloth 25 thus forms a chamber, or bag, into which the material may be introduced through the conduits 18 and 19. It will thus be seen that the cloth 25 and its contents may be removed from within the frame simply by moving the cloth supporting members 21 and 23 outwardly.

One method of accomplishing this is shown in Figs. 1, 3 and 7. The expansible plate, thus shown, comprises the side members 30 and 31, the top member 32 and the bottom member 33. Within these members are two expansible members composed of a series of plates 34, 34, 34, 35, 35, 35. The extended ends 36, 36 of each plate 34 forms recesses 37, 37, and the extended ends 38, 38 of each plate 35 forms recesses 39, 39. A series of revoluble shafts 40, 40, 40 extend between, and are supported by, and revoluble within, the side members 30 and 31, the lower shaft 40 extending through the side 31 and being capable of revolution from the exterior of the device. Fixedly attached to each shaft 40 is an arm 41, one extremity of each arm 41 being pivotally attached at 42 to the slidable members 43, 43, 43 and the other extremity of each arm 41 being pivotally attached at 44 to the slidable members 45, 45, 45. Each member 43 is slidable within the recesses 39, 39 and each member 45 is slidable within the recesses 37, 37.

Fig. 7 shows the expansible device in its unexpanded position, which is the position during the filtering process. When the filtering operation is completed, the lower shaft 40 is revolved which causes the slidable members 43 and 45 to move upwardly and downwardly, at the same time moving outwardly forcing the two series of plates to move outwardly from each other, into the position shown in Fig. 1. This outward movement of the members forces the filter cloth supporting members, with the cloth and its contents, to also move outwardly from its retained position within the frame and this movement may be great enough to cause the cloth and its contents to fall into a suitable receptacle.

A modification of my device is shown in Figs. 6, 7 and 9. In this form of my device both faces of the side members 10 and 11 have recesses 15, 15, and the filter cloth 50 (Fig. 9) is passed over the upper cloth supporting member 51 and fits within the recesses 15, 15 upon both sides of the end members 10 and 11.

I do not limit myself to the particular size, shape, number or arrangement of parts, as shown and described, all of which may be varied without going beyond the scope of my invention as shown, described and claimed.

What I claim is:—

1. In a filter press frame, in combination, a frame, recesses within the frame, a cloth-carrying member capable of removable insertion within the recesses and recesses within the face of the frame capable of receiving a cloth carried by the cloth-carrying member.

2. In a filter press frame, in combination, a frame, recesses in the upper and lower portions of the frame and cloth-carrying members capable of removable insertion in the upper and lower recesses.

3. In a filter press frame, in combination, a frame, recesses in the upper and lower portions of the frame, cloth-carrying members capable of removable insertion in the upper and lower recesses and recesses upon the face of the frame capable of receiving a cloth carried by the cloth-carrying members.

4. In a filter press frame, in combination, a frame, a removable cloth-carrying member and a feed conduit leading to the inner face of the frame.

5. In a filter press frame, in combination, a frame, recesses within the frame, a cloth-carrying member capable of removable insertion within the recesses and a feed conduit leading to the inner face of the frame.

6. In a filter press frame, in combination, a frame, a removable cloth-carrying member, recesses within the face of the frame capable of receiving a cloth carried by the cloth-carrying member and a feed conduit leading to the inner face of the frame.

7. In a filter press frame, in combination, a frame, recesses within the frame, a cloth-carrying member capable of removable insertion within the recesses, recesses within the face of the frame capable of receiving a cloth carried by the cloth-carrying member and a feed conduit leading to the inner face of the frame.

8. In a filter press frame, in combination, a frame, recesses in the upper and lower portions of the frame, cloth-carrying members capable of removable insertion in the upper and lower recesses and a feed conduit leading to the inner face of the frame.

9. In a filter press frame, in combination, a frame, recesses in the upper and lower portions of the frame, cloth-carrying members capable of removable insertion in the upper and lower recesses, recesses upon the face of the frame capable of receiving a cloth carried by the cloth-carrying members and a feed conduit leading to the inner face of the frame.

Signed at New York city in the county of New York and State of New York this 2nd day of June, 1919.

GEORGE F. MILLER.